United States Patent
Rallis et al.

[15] 3,661,684
[45] May 9, 1972

[54] APPARATUS FOR PRODUCING A PADDED ARTICLE

[72] Inventors: John Rallis, Marion, Ind.; James C. Dillon, Santa Ana, Calif.

[73] Assignee: The General Tire and Rubber Company

[22] Filed: July 15, 1979

[21] Appl. No.: 61,524

Related U.S. Application Data

[63] Continuation of Ser. No. 673,343, Oct. 6, 1967, Pat. No. 3,587,284.

[52] U.S. Cl. ............... 156/583, 156/380, 156/216, 161/161
[51] Int. Cl. ............... B30b 15/34, B32b 31/20, B29c 27/06
[58] Field of Search ............ 156/583, 380, 285, 515, 216, 156/286, 73; 161/160, 161

[56] References Cited

UNITED STATES PATENTS

| | | | |
|---|---|---|---|
| 3,091,946 | 6/1963 | Kesling | 161/161 X |
| 3,075,862 | 1/1963 | Hoyer | 156/216 X |
| 3,147,172 | 9/1964 | Wesa et al. | 156/216 X |
| 2,955,972 | 10/1960 | Wintermute et al. | 156/216 X |

Primary Examiner—Benjamin A. Borchelt
Assistant Examiner—J. J. Devitt
Attorney—Frank C. Rote, Jr.

[57] ABSTRACT

The hereinafter specification discloses an apparatus for forming, filling and closing a padded article. The article is provided with a hidden seam and is suitable for use as a cushion, chair seat, chair back, automobile crash pad, or the like. According to the invention, a cover sheet of plastic material is plug formed into a die cavity such that a pocket is created in the sheet. The pocket is filled with a foam padding and a rigid support member. A plastic cap sheet is applied and head sealed to the cover sheet using sliding seal bars to hide the seam and to close the article.

5 Claims, 5 Drawing Figures

Patented May 9, 1972

INVENTORS
JOHN RALLIS
JAMES C. DILLON

BY Kenyon, Palmer, Stewart & Estabrook
ATTORNEY

APPARATUS FOR PRODUCING A PADDED ARTICLE

CROSS-REFERENCE TO RELATED APPLICATIONS

This application is a continuation of patent application Ser. No. 673,343 filed on Oct. 6, 1967, now U.S. Pat. No. 3,587,284 entitled "Furniture Slat".

BACKGROUND OF THE INVENTION

1. FIELD OF THE INVENTION

This invention relates to an apparatus for producing a molded and padded article suitable for use in the furniture industry as a furniture slat, cushion, crash pad or the like.

2. THE PROBLEMS AND OBJECTS

In the highly competitive upholstery and furniture industries the production of padded articles usually requires the performance of several distinct and independent operations. For example, a shaped piece of foam such as polyurethane may be attached in one operation to a rigid seat member. The combined member may then be carried to another work station and there covered with a plastic or a fabric. Usually the covering material is fitted over the foam and stapled and/or glued to the rigid support. The covered unit is thereafter nailed or attached by screws to a frame such as a chair frame.

In a like manner the prior art has taught that chair seats can be upholstered in separate and distinct operations by applying and sealing plastic covering sheets to a supported foam pad. Such methods produce an unsightly and visible seam on the end product such that when the product is assembled, for example by being nailed or screwed to a chair frame, and used, the seam is directly subjected to stress forces. Sooner or later the seam fails in that the stress forces applied directly into the seam cause the covering materials to come apart at the seam. This last mentioned problem has affected the competitive position of an otherwise attractive and useful product.

Accordingly, it is the primary object of this invention to produce economically in a single continuous process an upholstered padded article.

It is another object of this invention to produce an upholstered and padded furniture slat that is provided with a seam located such that when the slat is in use the seam is hidden and not subjected to stress forces.

It is a further object of this invention to economically produce a padded article by forming the article in a single die cavity which uses sliding seal bars to adjust the size of the cavity opening.

These and other objects of the invention will become apparent upon a reading of the hereinafter described embodiment of the invention taken in conjunction with the drawings in which.

In carrying out our invention we employ a die cavity as a single element in which each of the steps of our process are carried out in a continuous molding and assembling operation. The die cavity is of the size and shape of the final product. The final product will vary depending on the use situation in which it is to be employed. For example, it may be a cushion, a chair seat, a crash pad for an automobile, or the like. It may also be resilient or substantially rigid depending on the use situation. As those skilled in the art will recognize many different end products can be produced by our invention by using different sized and shaped molds and different product materials.

Figure 5:
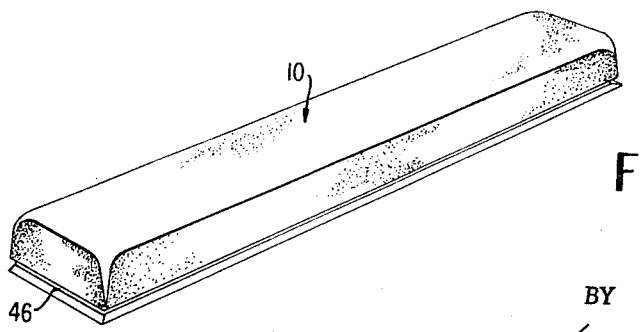

The product of the invention is shown in FIG. 5, and will hereinafter be referred to as a furniture slat 10, thus named in that in the preferred embodiment a rectangular parallelepipedal block is produced by our novel apparatus. This shape has particular utility as a building block in that when used with other slats of the same type, each being provided with snaps, they can be assembled to a chair frame provided with tabs to form a continuous seat and back. Similarly they can be attached to other frames such as footstool frames, chaise lounge frames, and the like to form the body rest portions for such furniture.

In the preferred embodiment, a cover sheet of thermoplastic material is formed into a pocket within a variable opening die cavity of the vacuum type. At the start of the operation the sheet is clamped above the cavity, is heated and stretched, and caused to enter the cavity through the use of a plug. During this operation the cavity has an enlarged opening; after the initial forming the cavity opening is partially closed off. Thereafter the cavity is evacuated causing the sheet to distend into contact with the side and bottom walls of the die cavity to thereby form a pocket and provide the sheet with an undercut at the cavity opening. Foam is then introduced into the cavity such that it fills a portion of the pocket formed by the molded thermoplastic sheet. A rigid support member may also be introduced into the cavity along with the foam. A cap sheet of thermoplastic material is thereafter employed to close off the die cavity and the furniture slat being produced. Portions of the cap sheet are brought into contact with portions of the covering sheet and the two touching portions are dielectrically sealed together. At the same time, the cap sheet is being sealed to the cover sheet, tear strips are created such that excessive material may be discarded after sealing.

As stated above the cover and cap sheets are thermoplastic and as will be recognized by those skilled in the art any thermoplastic film that lends itself to vacuum forming and heat sealing may be employed. For example, vinyls such as polyvinyl chloride, polyvinylidene chloride, and the vinyl acetate copolymers may be used in the process. Other suitable thermoplastics are polypropylene, acrylonitrile butadiene styrene, and polyethylene. Similarly, the foams used as padding may be resilient or rigid depending on the end product desired. For example, polyurethane, sponge rubber, foam rubber, foamed polyvinyl chloride may be employed as padding.

Figure 1:
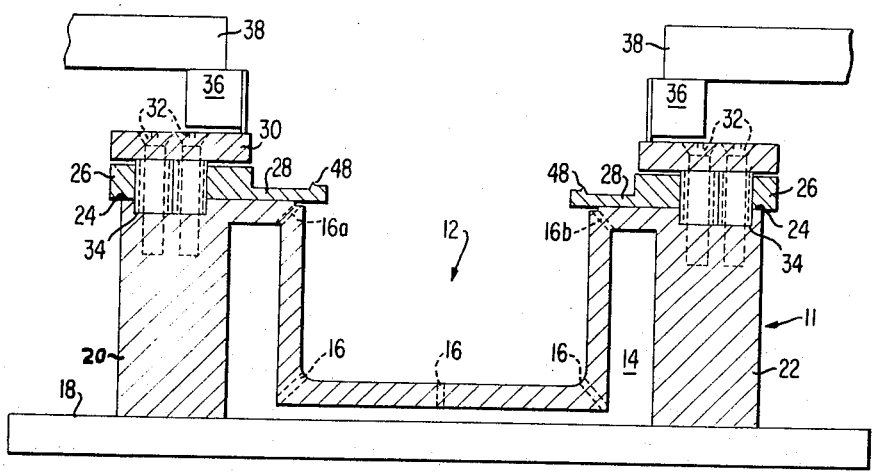
FIG. 1 is a sectional elevational view of a mold assembly employed in the method of the invention.

Referring now to FIG. 1 of the drawings, a cavity mold apparatus 11 is shown having a die cavity 12. The cavity mold is of the vacuum type and is provided with a vacuum manifold 14 having ports 16 communicating with the die cavity. The vacuum manifold is connected in the usual manner to a vacuum head, not shown. The mold 11 is supported on a mounting plate 18 which plate is utilized in the form shown to close off the vacuum manifold 14 on the bottom side and as an electrical ground for the mold apparatus.

Figure 2:
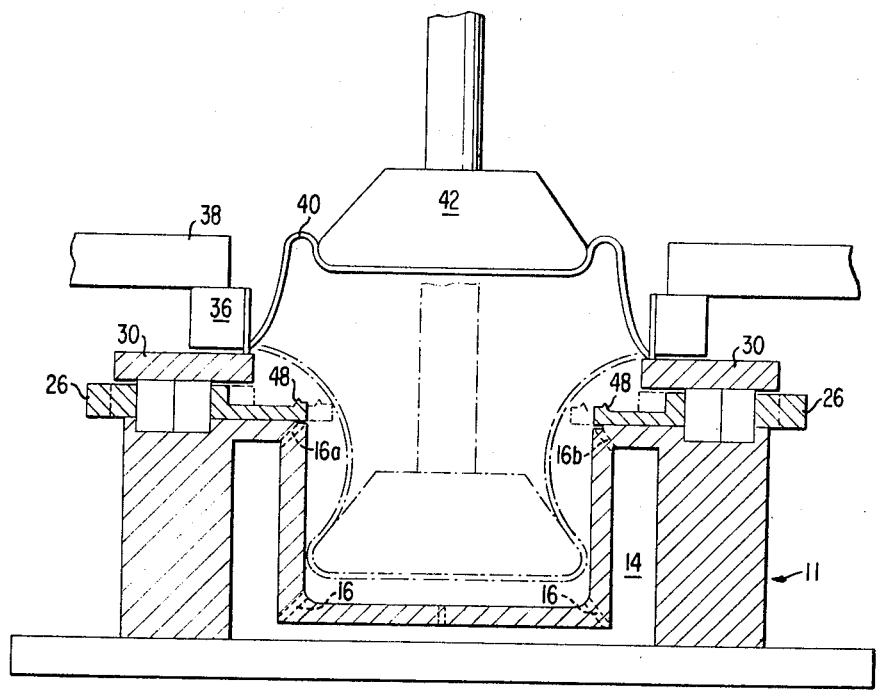
FIG. 2 is the view of FIG. 1 showing the mold cavity enlarged and showing a plug forming operation.

The mold apparatus is provided with vertical side walls 20 and 22 terminating in a top surface 24. It will be understood that the top surface and the side walls have a continuous perimeter and are shown broken in FIGS. 1 through 4 of the drawing for the purpose of describing the method of operation. A pair of seal bars 26 are shown supported for sliding movement on the top surface 24. Each of the seal bars is provided with a projecting arm 28 extending over a portion of the die cavity 12 as shown in FIG. 1. The seal bars are retractable such that the opening to the die cavity may be enlarged as shown in FIG. 2. Although only two seal bars have been shown it will be understood that the number and configuration of such bars will depend on the size and shape of the die cavity. Thus where the cavity is essentially rectangular in horizontal cross section four seal bars may be adequate, one for each side of the rectangle.

The side walls 20 and 22 also are used to support a top plate 30 in spaced relationship to and above the top surface 24. The spacing between the surface 24 and plate 30 must be such that the seal bars are left sufficient room to frictionally slide on the surface 24. For this purpose the top plate is held in fixed spaced relationship by suitable means such as positioning and locking screws 32 which screws extend through the top plate and spacer member 34 and engage in suitable threads in the walls 20 and 22.

A clamp frame 36 which may be of the usual type is shown supported by and on the top plate 30. The usual clamp frame holddown 38 is shown abutting on the clamp frame 36. The actual construction of the cavity mold, top plate, clamp frame and frame holddown, their shape and size do not form part of our invention. It will be recognized that their shapes, sizes and the materials out of which they are made will be determined by the types of padded articles to be produced and the materials to be employed in their production. For example, if a furniture slat 10 of the type shown in FIG. 5 is to be produced by the cavity mold, the mold cavity will be essentially a rectangular parallelepiped. Obviously the other parts of the apparatus will generally conform in shape to be operational in conjunction with the mold.

Similarly it will be understood that various arrangements of apparatus for controlling the movements of various parts, hereinafter described, may be employed. Thus the seal bars have been described as retractable and they of course can be operated by mechanical means such as an electrically controlled air operated piston or they may be operated by hand. In addition, the frame 36 can be operated by mechanical means under electrical control or it may be operated by hand. In the preferred embodiment the seal bars, clamp frame, and other portions of the apparatus are actuated by pistons where the pistons in turn are subject to electrical control and most of the operations are performed automatically in response to electrical signals.

Figure 3:
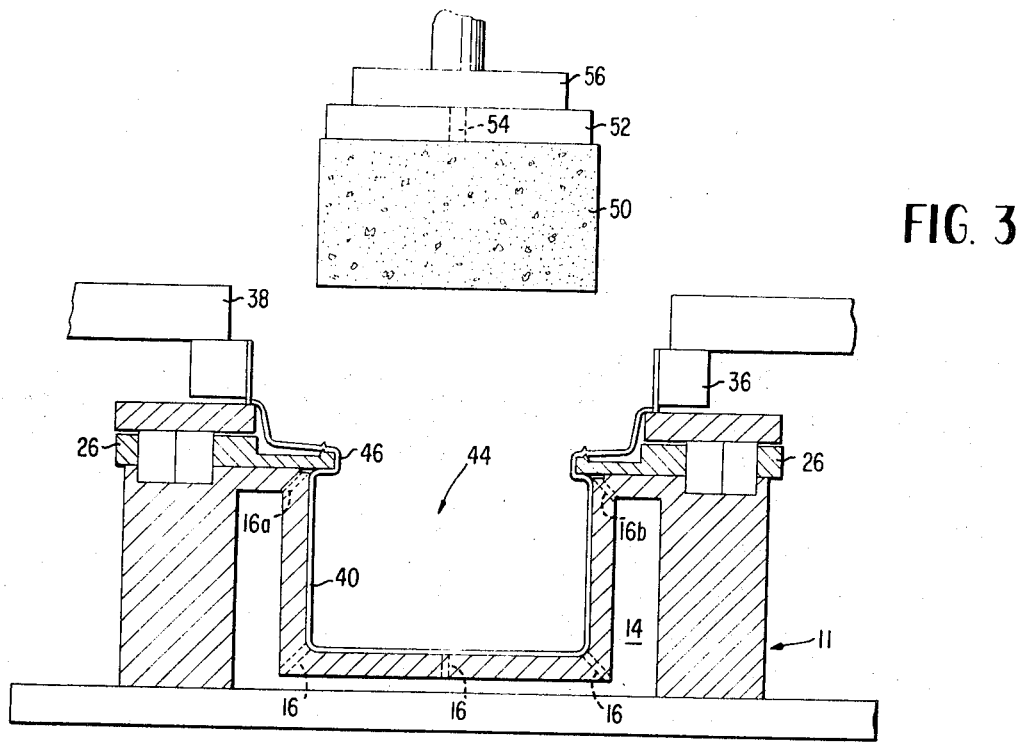
FIG. 3 is the view of FIG. 1 showing the positioning for placement of a foam pad and a rigid support member.

A typical method utilizing the apparatus of our invention will be described with respect to FIGS. 2 through 4 of the drawings. As shown in FIG. 2 of the drawings, a cover sheet of thermoplastic material 40 for example polyvinyl chloride, is clamped in the frame 36 and heated until it is sufficiently soft for stretching and forming. The temperature and the amount of time it would take to achieve that temperature for any given sheet 40 will depend on variables such as the actual material employed as a covering material and its thickness. After the sheet has been sufficiently softened such that it is susceptible of being formed, compressed air is introduced into the vacuum manifold 14 for the purpose of blowing the cover sheet up against a plug 42. The plug may have included therein a heater so as to prevent freezing of the sheet 40 in the area immediately below the plug. The bottom face of the plug is generally of the dimension of the bottom of the cavity 12 such that when the hot sheet 40 is blown up against the plug it is stretched to a size to generally conform with the bottom of the die cavity.

The plug 42, almost immediately after being contacted by the sheet 40, is caused to descend vertically towards the cavity 12. At the same time the seal bars 26 are retracted to thereby enlarge the opening to the cavity. The plug, continuing its descent, enters the cavity 12 causing the air under the cover sheet to be somewhat compressed and thereby effect a blow-molding of the sheet in that portion of the cavity 12 that is adjacent to the top surface 24 of the cavity mold 11. The compressed air escapes from around the top of the mold 11 and between same and the sheet 40; as a result the sheet 40 is to some degree pushed away from the side walls of the die cavity. This insures a certain amount of stretching of the sheet material 40 and at the same time the stretched and essentially preformed material closely approximates the general configuration of the final mold shape.

A vacuum is then applied causing the covering material 40 to be immediately snapped against the sidewalls and bottom wall of the die cavity. The covering material is thus shaped by the mold to form a pad receiving pocket 44. As is usual, the thermoplastic sheet material cools very rapidly after the vacuum molding; however, as will be understood, it retains a certain amount of flexibility. It will be noticed that ports 16A and 16B located at the upper corners of the die cavity 12, and partially cut into the upper surface 24 of the cavity mold 10, cause the material 40 to wrap around the end portions of the projecting arms 28 of the seal bars 26 thus causing an indentation or undercut 46, see FIG. 5, to be formed in the material 40 adjacent to that area that will eventually be the bottom of the furniture slat. After vacuum forming and cooling of the sheet material, the projecting arms 28 are retracted to permit withdrawal of the plug 42 from the cavity, the material being pliable enough to permit the plug to pass by the undercut 46. The projecting arms 28 are then returned to their original closed position such that the mouth of the cavity is reduced in size.

With the cover sheet formed or distended against the wall of the cavity 12, the padding material and rigid support member, if any such member is to be utilized, may now be introduced into the pocket 44. For the purposes of explanation, it will be assumed that a rigid member is to be employed and that the padding or foam is preformed and attached to the rigid member by a conventional adhesive. As shown in FIG. 3, a foam member 50 is preformed to the shape of the pocket 44, and it is attached to and supported by a rigid support member 52. The member 52 may be made out of metal, wood or hard plastic depending on the use situation, in which the furniture slat is to be employed. For example, if the end product is the furniture slat 10 of FIG. 5, and if it is to be employed as a building block for a garden patio chair, then the member 52 may be made out of aluminum sheeting. The rigid member is provided with a center hole 54, or a series of such holes, which serve at the time of placement as a means by which the rigid member may be attached to a vertical injector or plunger 56. The support member 52 may conveniently be attached to the plunger 56 by means of spring clips extending downwardly from the plunger and engaging with the support member in the hole 54.

The seal bars 26 are now retracted, and during retraction they carry that portion of the cover sheet 40 that forms the product undercut 46 back with them. The retraction of the seal bars is necessary in order that the opening to the pocket 44 may be enlarged such that it is capable of receiving the foam and support member. The plunger 56 is activated, such that it descends toward the pocket to thereby effect the loading of the pocket with the foam and support member. The loading operation takes place almost simultaneously with the reaction of the seal bars. The seal bars are returned almost immediately after loading; at the same time the plunger 56 is disengaged from the support 52 and returned to its initial position.

Alternatively, the foam may be inserted into the pocket 44 as an elastomer along with a foaming agent. The pocket is then capped off in the usual manner, and the urethane is foamed and cured in place. The rigid member may then be inserted as described above.

Figure 4:
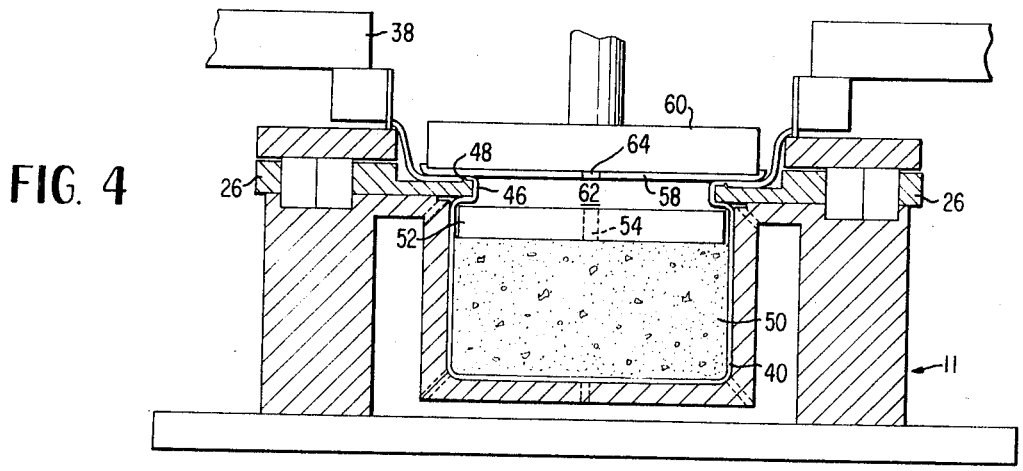
FIG. 4 is the view of FIG. 1 with the foam and support member shown in place and showing the closing off and sealing of a furniture slat; and, FIG. 5 is a perspective view of a furniture slat made in accordance with the process of this invention.

Referring now to FIG. 4, a cap sheet 58, which cap sheet is usually of the same thermoplastic film as employed for the cover sheet 40, is placed so as to close off the pocket 44 and thus the slat 10. The cap sheet is brought into touching contact with those portions of the cover sheet 40 that lay on top of edge 48 that rises from projecting arm 28. The cap sheet 58 is then sealed to the cover sheet at the said points to thereby form a hidden seam, or that is, the seam is made on the bottom surface of the furniture slat.

The cap sheet is dielectrically sealed to the cover sheet in those areas where the two sheets are in contact with each other. This area of contact is normally inside of the perimeter of the slat, and is therefore not seen when viewed from above. To perform the sealing operation the seal bars 26 are utilized as electrodes, and an electrical potential is established between the seal bars and a plunger electrode 60. When the sealing operation is effected the electrode 60 is operated to descend and contact the cap sheet 58 such that the electrode exerts pressure on those areas of the two sheets that are to be fused together. Thus the contacting portions of the cap and cover sheets constitute a dielectric between the electrodes 26 and 60. The potential field and pressure is maintained until the temperature of the thermoplastic sheets is raised to such a point that they fuse into one another, and this normally occurs almost instantaneously. As a result of the fusion and pressure the cap sheet and preformed sheet are thinned by a raised edge 48 on each projection arm 28.

After the cap sheet is sealed to the cover sheet, the plunger electrode 60 is removed and the excess material is stripped off by tearing it along the perforated lines created by the edges 48. The seal bars are then retracted and the completed article is removed from die cavity 12.

It will be noticed that in forming the undercut 46 an airspace 62 was formed between the cap sheet 58 and the support member 52. The airspace acts as an additional cushion and collapses when pressure is exerted on the furniture slat. To this end the cap sheet is provided with breather holes or perforation 64 which allow air to be expelled from the furniture slat. In addition, the holes 54 in the rigid member 52 provide air channels from the foam to the space 62, thus allowing for breathability for the foam if necessary.

It is of particular importance to note that when a furniture slat produced by our apparatus is employed in a use situation the pressure exerted on the slat will be in a direction normal to the hidden seam. The seam therefore is not subjected to those forces of stress that usually resulted in seam failure in the prior art articles as heretofore explained. It should also be noticed that by hiding the seam the slat is made more attractive than prior art padded articles. This latter named attraction is of considerable importance in the industry in that it contributes substantially to the saleability of articles of furniture.

One convenient means for fastening the furniture slat to chair frames and the like is to provide the slat with snaps such that it may be detachably connected to tabs on furniture frames. For example, if the slats are made 17 inches long by 2 ¼ inches wide by 1 inch in height, twelve such slats may be snapped to a side chair or rocker to create a continuous seat and back.

Although the foregoing description is necessarily of a detailed character, in order that the invention may be completely set forth, it is understood that the specific terminology is not intended to be restrictive or convining and that various rearrangement of parts and modification of detail may be resorted to without departing from the scope or spirit of the invention as herein claimed.

We claim:

1. In an apparatus for producing a padded article covered by a thermoplastic material, including a die that describes a cavity having the size and shape of the article, means for plug forming a first sheet of thermoplastic material into said cavity and for vacuum forming the sheet therein, and means for heat sealing a second sheet of material to the first sheet, the improvement comprising means for controllably increasing and decreasing the size of the opening of said die cavity during production of the padded article including a plurality of movable sealing bars, each said bar having an arm which projects across said opening in a first position to restrict the size of said opening which can be retracted to a second position to increase the size of said opening, and further including an electrode adapted to contact each said arm while in its projected position to dielectrically heat seal the first and the second sheets to one another.

2. The apparatus according to claim 1 wherein each said projecting arm contains a raised edge adapted to contact said electrode to thereby score the two sheets of material to facilitate the trimming thereof.

3. In an apparatus for covering a flexible, shaped foam article with two sheets of thermoplastic material and for heat sealing the peripheral portions of the two sheets together, comprising a die that describes a cavity having the size and shape of the article and means for gripping the first of the two sheets, for plug forming the first sheet into said die cavity, and for vacuum forming it therein, the improvement wherein the opening of said die cavity is defined by sealing means comprising at least one slidable sealing bar along the side of said cavity defining the opening thereof, adapted to move between a first position wherein said opening of said die cavity is restricted to a dimension that is smaller than that of said cavity and a second position wherein said opening of said cavity is no smaller than that of said cavity, and including a raised edge on said sealing bar adapted to engage the first sheet when it is in contact with the second sheet, and a plunger electrode to contact the two sheets along said raised edge to dielectrically heat seal and to score the sheets.

4. An apparatus for covering a foam supported arm rest with a thermoplastic material and for heat sealing the edges of the material together comprising:
A. A die cavity having an opening, sides and a bottom,
B. A clamp for supporting a thermoplastic sheet outside of said cavity said clamp spaced from and in proximity to said opening,
C. Means for heating the thermoplastic sheet to its heat softened temperature,
D. A movable plug former to push the heat softened sheet into the cavity, and
E. A vacuum manifold for pulling the softened plug formed sheet into the cavity,
the improvement comprising:
1. A slidable, electrically conductive, seal bar at the opening of the cavity on each side thereof between the cavity and the clamp, each seal bar having a projecting arm, the bars capable of cooperatively sliding to vary the size of the cavity opening and to permit the passage of the plug former therethrough, and
2. Electrode means movable into contact with each seal bar to dielectrically seal the heat softened thermoplastic sheet.

5. The apparatus according to claim 4 further improved by the use of electrically controlled pistons for concurrently actuating all of the slidable seal bars.

* * * * *